March 17, 1953     W. TODD     2,632,100
SIGNAL DISCRIMINATING SYSTEM
Filed Sept. 26, 1949
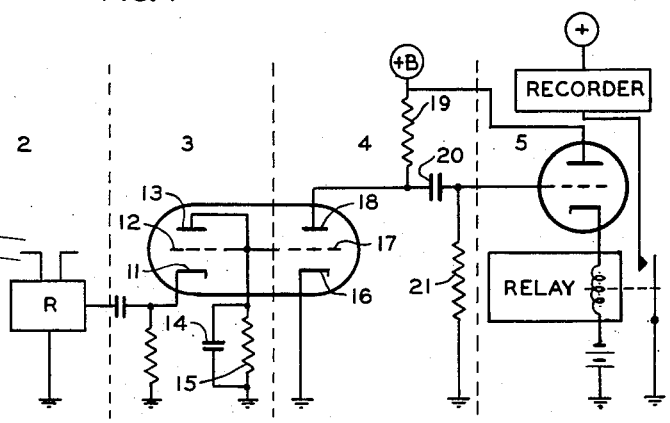
FIG. 1
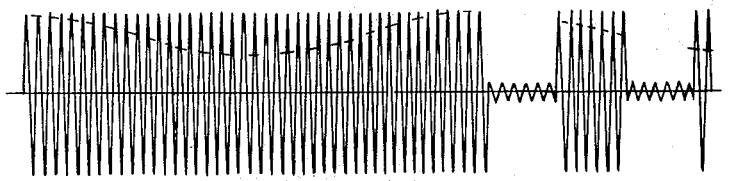
R.F. TRANSMISSION &
SUB-A.F. ENVELOPE OF R.F. RECEPTION
FIG. 2₁
A.F. SUB-CARRIER &
SUB-A.F. ENVELOPE OF R.F. RECEPTION
FIG. 2₂
SUB-A.F. ENVELOPE OF A.F. SIGNAL
FIG. 2₃
INVERTED &
DIFFERENTIATED SUB-A.F. ENVELOPE
FIG. 2₄
*INVENTOR.*
WILLIAM TODD
BY Lawrence Glassman
*ATTORNEY*

Patented Mar. 17, 1953

2,632,100

UNITED STATES PATENT OFFICE 2,632,100

SIGNAL DISCRIMINATING SYSTEM

William Todd, Interlaken, N. J., assignor to the United States of America as represented by the Secretary of the Army Application September 26, 1949, Serial No. 117,751

2 Claims. (Cl. 250—2)

(Granted under Title 35, U. S. Code (1952), sec. 266)

The invention described herein may be manufactured and used by or for the Government for governmental purposes, without the payment of any royalty thereon.

This invention relates to a signal descriminating system for distinguishing those variations in amplitude of a signal wave which are due to intelligence transmitting modulations, from those variations in amplitude which are caused by fading of the signal due to changes in the atmosphere, relative orientation of the transmitting and receiving antennae, and other conditions.

In the use of weather observing balloons and similar devices carrying radio transmitters for meteorological purposes, since the devices are not subject to any effective control of their position, it is very common for the apparatus to swing or rotate at a fairly low frequency and, therefore, change the orientation of the transmitting antenna relative to the receiving antenna. The fading caused by this rotation, and various other conditions which affect the transmission of the signals, may have an effect on receiving apparatus somewhat similar in magnitude to that caused by the variation in signal strength which was intentionally supplied at the transmitter as a modulation in order to convey the necessary intelligence. The intelligence transmitting modulations are normally of intervals corresponding to a moderate frequency, while the variations caused by fading, from any of the usual causes, are likely to be of very low frequency and outside the usual range of frequencies of the intelligence transmitting modulations.

It is a primary object of the present invention to provide suitable means for distinguishing the effects of these variations, so that receiving apparatus responsive to the intelligence transmitting modulations will not respond to those variations which are in the nature of fading. The circuits may also perform the functions of discriminating according to width of pulse signal or interval as shown in application for Radio Pulse Receiver Interference Eliminator, Serial No. 633,255, filed December 6, 1945, Patent No. 2,512,699, issued on June 27, 1950, by the same inventor.

In the drawings:

Fig 1 diagrammatically represents the invention in one of its typical applications.

Figs. $2_1$ to $2_4$ represent the wave forms of the various signals involved in the operation of the invention.

In Fig. 1, the various components have been indicated as separated by dotted lines and the numerals 1 to 5 have been applied to indicate the various components. The numeral 1 indicates a transmitter carried by a free floating balloon, such as that often used for transmitting weather information to a ground station. The numeral 2 indicates a suitable receiver on the ground, or possibly on some vehicle, which is responsive to the signals transmitted by the balloon supported transmitter.

The particular transmitter shown as element 1 is arranged to transmit a substantially continuous radio-frequency signal with interruptions of interval corresponding to a low audio frequency serving to transmit the desired intelligence from the balloon supported transmitter to the receiving station. The wave form of the transmitted radio-frequency signals is illustrated in a simplified zigzag form in Fig. $2_1$, and includes an initial period in which no intelligence transmitting variations are being imposed and a final period in which there are such variations. The effect of fading on the wave form of the transmitted signals is revealed in the same figure by a dashed line showing the modified envelope of the radio-frequency signals as received, indicating that the initial period of the signal involves a small sub-audio-frequency variation; while the final period may involve a similar low frequency variation, this is not apparent in view of the modulations involved in the higher frequency intelligence transmission. A transmitter normally off and pulsed on for signals would give similar results.

The receiver 2 includes the usual radio-frequency channels and, as shown herein, also includes a suitable audio-frequency chopper, which serves to interrupt the received signals at an audio frequency rate to produce modulated pulses of energy of a frequency which may be readily amplified. This chopper in effect establishes a sub-carrier with the same modulation. The waveform of the output is illustrated by Fig. $2_2$. The invention may also be practiced with a receiver which does not utilize the audio-frequency sub-carrier whether produced by a chopper, heterodyne oscillator, or other means at the transmitter or receiver, but amplifies the radio frequency carrier directly to provide the desired output.

In order to separate out intelligence transmitting modulations from the sub-carrier, a diode type detector 3 is provided which involves a conventional input circuit through the cathode 11 of a triode, to the grid 12 and plate 13, which are connected together to jointly act as an anode. Due to the rectifying action of elements 11, 12 and 13, a negative voltage is built up on the anode condenser 14, which is shunted by a resistor 15, to discharge condenser 14 at such a rate that it may follow the wave envelope, including the intelligence transmitting modulations, but not follow the audio-frequency chopping modulations. For this purpose, the time constant of the circuit, including condenser 14 and resistor 15, must be substantially greater than the interval of the audio-frequency chopping modulations and may be of the same order as the interval of the intelligence transmitting modulations. The output of element 3 is as shown in Fig. 2₃, and includes low audio-frequency intelligence signal components and sub-audio-frequency fading components, and serves as the control voltage for element 4 of the circuit; a small ripple is shown in this curve but with the actual frequencies used this would probably not be perceptible.

The element 4 includes a conventional triode D.-C. amplifier circuit having a triode tube with a grounded cathode 16, a grid 17 directly connected to the output of element 3 and a plate 18 connected through a plate resistor 19 to a suitable source of plate potential. The amplifier portion of the element 4 performs only the usual function of amplification and inversion. In order to reduce the effects of fading the capacitor 20 is used to couple the output of the amplifier circuit to a resistor load 21, which is so proportioned relative to the capacitor 20 that the time constant of this circuit is of the order of the interval of the intelligence transmitting modulations. This capacitor resistor circuit therefore functions to differentiate the output of the amplifier tube so that the differential of the sub-audio frequency fading component has a very low amplitude and substantially no effect on the output voltage of this element 4, while the differential of the comparatively higher frequency component, due to the intelligence transmitting modulations, has a relatively high amplitude and a very substantial effect on the output, even though the voltage components in the output of the amplifier itself before such differentiation were of similar magnitude. The curve of the output of element 3 is illustrated in Fig. 2₃ as a negative voltage relative to ground. The amplifier portion of element 4 merely reverses the polarity of this curve without any important change in its shape or relation to ground. Since this amplifier output is used only after differentiation, the relation to ground is of no significance to the operation. The ultimate curve of the inverted and differentiated output is illustrated in Fig. 2₄, but it should be noted that the differential of the fading component would actually be less than could be conveniently illustrated at any reasonable scale.

The output of element 4 is applied directly to element 5 which is a conventional power output circuit, including any suitable output means such as a relay and recorder which are responsive to voltages of suitable magnitude as provided by the differentiating circuit in element 4 and determined by the bias voltages used in element 5.

The polarity of the connections determines whether element 5 would be responsive to (a) the end of an interval, or beginning of a pulse, as shown herein, or (b) the beginning of an interval or end of a pulse. The relative advantages of the connections are explained in the above identified prior application for interference eliminator.

The foregoing illustrates a typical application of this invention.

What is claimed is:

1. In a meteorological balloon radio system, a continuous wave radio frequency transmitter supported by a free floating balloon, means to modulate the output of said radio frequency transmitter by signals of an interval corresponding to a predetermined frequency range in accordance with atmospheric intelligence to be conveyed, a remote receiver responsive to the modulated output of said transmitter as further unintentionally modulated at a frequency lower than said predetermined frequency by low frequency variations in transmission between said transmitter and receiver, means to detect both said modulations, means to impress said modulations on a differentiating circuit having a time constant substantially equal to the interval of said intelligence conveying modulations and shorter than the interval of said low frequency variations, and output means responsive to a predetermined amplitude of the differentiated output of said circuit, whereby modulations in accordance with the intelligence to be conveyed are effective to control said output means and modulations due to said variations in transmission are ineffective to control said output means.

2. The system of claim 1, wherein said output means includes a relay adapted to respond to said predetermined amplitude of the output of said differentiating circuit, and means activated by said relay, for recording said intelligence transmission modulations.

WILLIAM TODD.

REFERENCES CITED

The following references are of record in the file of this patent:

UNITED STATES PATENTS

| Number | Name | Date |
| --- | --- | --- |
| 2,099,536 | Scherbatskoy et al. | Nov. 16, 1937 |
| 2,113,214 | Luck | Apr. 5, 1938 |
| 2,160,224 | Minton | May 30, 1939 |
| 2,161,764 | Minton | June 6, 1939 |
| 2,251,973 | Beale et al. | Aug. 12, 1941 |
| 2,266,401 | Reeves | Dec. 16, 1941 |
| 2,448,718 | Koulicovitch | Sept. 7, 1948 |
| 2,481,515 | Isbister | Sept. 13, 1949 |

OTHER REFERENCES

"An Anti-Clutter Radar Receiver," by Alfred & Weiss, Journal of the Inst. of Elect. Eng., November 1948, Vol. 95, Part III, No. 38 pages 459 to 465.